(12) United States Patent
Schaefer et al.

(10) Patent No.: US 11,536,310 B2
(45) Date of Patent: Dec. 27, 2022

(54) LOCKING PUSH-PULL FASTENER ASSEMBLY

(71) Applicant: Raytheon Company, Waltham, MA (US)

(72) Inventors: Robert D. Schaefer, Huntington Beach, CA (US); Andrew L. Bullard, Manhattan Beach, CA (US); Brian R. Schaefer, Huntington Beach, CA (US); Michael C. Barr, Torrance, CA (US)

(73) Assignee: Raytheon Company, Waltham, MA (US)

( * ) Notice: Subject to any disclaimer, the term of this patent is extended or adjusted under 35 U.S.C. 154(b) by 342 days.

(21) Appl. No.: 16/719,618

(22) Filed: Dec. 18, 2019

(65) Prior Publication Data
US 2021/0190126 A1  Jun. 24, 2021

(51) Int. Cl.
*F16B 39/282* (2006.01)
*F16B 39/24* (2006.01)

(52) U.S. Cl.
CPC ............ *F16B 39/282* (2013.01); *F16B 39/24* (2013.01)

(58) Field of Classification Search
CPC ...... F16B 5/0283; F16B 13/04; F16B 13/061; F16B 13/141; F16B 39/10; F16B 39/24; F16B 39/282; F16B 43/00; Y10S 411/917
USPC ......... 411/21, 22, 82, 82.1, 337, 371.2, 383, 411/432
See application file for complete search history.

(56) References Cited

U.S. PATENT DOCUMENTS

| | | | |
|---|---|---|---|
| 1,352,201 A | * | 9/1920 | Kennedy ............ F16B 13/0841 411/33 |
| 4,295,625 A | | 10/1981 | Degger et al. |
| 4,298,248 A | | 11/1981 | Lapp |

(Continued)

FOREIGN PATENT DOCUMENTS

| | | |
|---|---|---|
| CN | 107228114 A | 10/2017 |
| DE | 832223 C | 2/1952 |

(Continued)

OTHER PUBLICATIONS

Hughes Standard, "Hughes Standard Screws", Specification Control Document, Nov. 12, 1981, 14 pages, Revision D and G.

(Continued)

*Primary Examiner* — Roberta S Delisle

(57) ABSTRACT

A precision adjustment fastener mechanism comprises a base, a platform, and a locking push-pull fastener assembly. The base has a first aperture and the platform has a second aperture. The fastener assembly is disposed within the second aperture. The fastener assembly comprises a clamping fastener having a portion positioned in the first aperture, a sleeve having a third aperture extending along an axis of the sleeve. The clamping fastener is positioned within the third aperture. The sleeve comprises a first portion moveable relative to a second portion along the axis. The first portion and the second portion each comprise outer threads. An axial displacement portion separates the first and second portions and transmits a torque between the first and second portions. The axial displacement portion facilitates movement of the first and second portions to bind threads of the first and second portions with the threads of the platform.

19 Claims, 15 Drawing Sheets

(56) References Cited

U.S. PATENT DOCUMENTS

| | | | | |
|---|---|---|---|---|
| 4,944,523 | A | * | 7/1990 | Hardy, Jr. .......... B60G 21/0551 280/124.152 |
| 5,551,722 | A | * | 9/1996 | Schwartz .......... B60G 21/0551 280/124.152 |
| 5,692,863 | A | | 12/1997 | Louw |
| 5,704,631 | A | * | 1/1998 | Sparks ................. F16F 3/0873 280/124.101 |
| 5,944,467 | A | * | 8/1999 | Yuta .................... F16B 37/0842 411/57.1 |
| 6,164,884 | A | * | 12/2000 | Mayr ..................... F16B 13/02 411/36 |
| 6,572,127 | B2 | * | 6/2003 | Pazdirek ................ B60G 11/12 280/124.152 |
| 6,972,885 | B2 | | 12/2005 | Hiley et al. |
| 8,556,558 | B1 | * | 10/2013 | Hunt .................... F16B 39/021 411/395 |
| 10,145,506 | B2 | | 12/2018 | Bullard |
| 2004/0067121 | A1 | * | 4/2004 | Huang ................. F16B 13/124 411/32 |
| 2018/0142830 | A1 | | 5/2018 | Bullard |

FOREIGN PATENT DOCUMENTS

| | | |
|---|---|---|
| EP | 1298333 A1 | 4/2003 |
| FR | 2566483 A1 | 12/1985 |
| GB | 156084 A | 12/1922 |
| GB | 783579 A | 9/1957 |
| WO | WO 2018/048890 A1 | 3/2018 |
| WO | WO 2018/221501 A1 | 12/2018 |

OTHER PUBLICATIONS

Newport, Tip and Tilt Platform, Includes AJS Adjustment Screws, ¼-20 Thread, https://www.newsport.com/p/39, to the best of applicant's knowledge article was available before the application filing date, 1 page, retrieved from https://www.newport.eom/p/39.

Raytheon Company, Prior Art, PowerPoint disclosure, to the best of applicant's knowledge prior art was available before the application filing date of Dec. 18, 2019, 1 page, Waltham, Massachusetts.

International Search Report for International Application No. PCT/US2020/055783 dated Dec. 21, 2020, 16 pages.

* cited by examiner

LOCKING PUSH-PULL FASTENER ASSEMBLY

BACKGROUND

Precision adjustment fastener mechanisms commonly use locking push-pull fastener assemblies, such as a push-pull screw, to mount a platform to a base and enable a degree of adjustability between the platform and the base. In some examples, the locking push-pull fastener assembly has a threaded sleeve and is rotatably coupled within a threaded hole of the platform. The threads of the threaded sleeve interface with the threads of the threaded hole, such that a user is able to adjust the position of the platform relative to the base through rotation of the sleeve. In some examples, a precision adjustment fastener mechanism may use three locking push-pull fastener assemblies to adjust a platform in an angular direction relative to the base.

Once the operator has adjusted the position of the platform relative to the base, it is beneficial to be able to lock the locking push-pull fasteners in position. Past solutions have included application of thread locking compounds to the threads between the threaded sleeve and threaded hole, or causing the threaded sleeve to expand radially within the threaded hole. However, these approaches have drawbacks. In the case of a thread locking compound, future adjustment of the locking push-pull fastener assembly may be difficult as the thread locking compound will likely be fractured, which can leave significant amounts of hard to remove residue or debris that must be cleaned off before applying additional or new thread locking compound. Additionally, current techniques for expanding a sleeve radially may introduce decreased moment carrying capacity of the locking push-pull fastener assembly.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
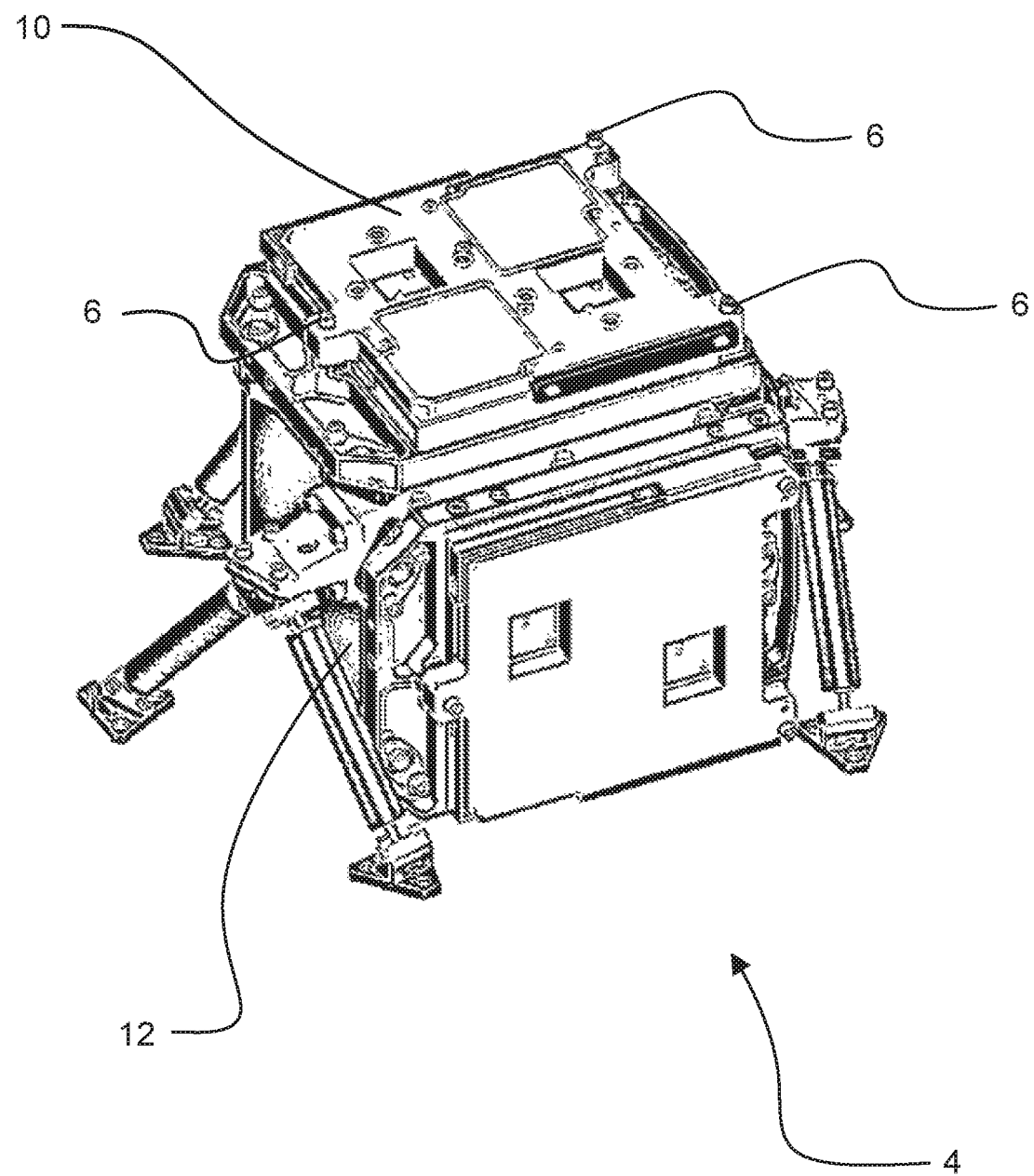
FIG. 1 illustrates an isometric view of a platform mounted to a base by precision adjustment fastener mechanisms, in accordance with an example of the present disclosure.

Reference will now be made to the examples illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of the inventive concepts is provided below and then specific examples are described in further detail later. This initial summary is intended to aid readers in understanding the examples more quickly, but is not intended to identify key features or essential features of the examples, nor is it intended to limit the scope of the claimed subject matter.

In one example, disclosed is a locking push-pull fastener assembly for facilitating the locking of a precision adjustment fastener mechanism. The locking push-pull fastener comprises a fastener and a sleeve. The sleeve has an aperture extending along a axis of the sleeve and the fastener is positioned within the aperture. The sleeve comprises a first portion moveable relative to a second portion along the axis with the first portion comprising an outer surface having one or more threads operable to interface with one or more inner threads of a platform, and the second portion comprising an outer surface having one or more threads operable to interface with one more inner threads of the platform, and an axial displacement portion separating the first and second portions with the axial displacement portion transmitting a torque between the first and second portions around the axis, and facilitating axial movement of the first and second portions relative to one another. The movement of the first and second portions relative to one another binds the one or more threads of the outer surfaces of the first and second portions with the one or more inner threads of the platform to axially lock the sleeve to the platform upon the sleeve being subject to an axially compressive force by the fastener.

In accordance with a more detailed aspect, the axial displacement portion can comprise a plurality of cuts in the sleeve extending from the aperture to an outer surface of the axial displacement portion.

In accordance with a more detailed aspect, the axial displacement portion can further comprise a relief formed in an outer surface of the axial displacement portion.

In accordance with a more detailed aspect, at least one cut of the plurality of cuts can be offset along the axis from at least one other cut of the plurality of cuts.

In accordance with a more detailed aspect, at least one cut of the plurality of cuts can be in a plane normal to the axis.

In accordance with a more detailed aspect, at least one of the cuts can extend in an axial direction.

In accordance with a more detailed aspect, the locking push-pull fastener can further comprise at least one recess at an end of the sleeve for receiving an adjustment tool.

In accordance with a more detailed aspect, the axial displacement portion can comprise a first plurality of recesses in the first portion and a second plurality of recesses in the second portion and a plurality of pins sized and shaped to be received in the first plurality of recesses and the second plurality of recesses.

Also disclosed is a precision adjustment fastener mechanism comprising a base, a platform, and a locking push-pull fastener assembly. The base has a first aperture for receiving a clamping fastener. The platform has a second aperture having one or more inner threads. The locking push-pull fastener assembly can be disposed within the second aperture. The locking push-pull fastener assembly comprises a clamping fastener and a sleeve. The clamping fastener has a portion positioned in the first aperture. The sleeve has a third aperture extending along an axis of the sleeve and the clamping fastener is positioned within the third aperture. The sleeve comprises a first portion moveable relative to a second portion along the axis with the first portion comprising one or more outer threads operable to interface with the one more inner threads of the platform, and the second portion comprising one or more outer threads operable to interface with the one more inner threads of the platform, and an axial displacement portion separating the first and second portions. The axial displacement portion transmits a torque along the axis between the first and second portions, and facilitates movement of the first and second portions relative to one another to bind the one or more threads of the outer surfaces of the first and second portions with the one or more inner threads of the platform to axially lock the sleeve to the platform upon the sleeve being subject to an axially compressive force by the clamping fastener.

In accordance with a more detailed aspect, the axial displacement portion can further comprise a relief formed in an outer surface of the axial displacement portion.

In accordance with a more detailed aspect, the axial displacement portion can comprise a plurality of cuts in the sleeve extending from the aperture to an outer surface of the axial displacement portion.

In accordance with a more detailed aspect, at least one cut of the plurality of cuts can be offset along the axis from at least one other radial cut of the plurality of cuts.

In accordance with a more detailed aspect, at least one of the cuts can extend in an axial direction.

In accordance with a more detailed aspect, the clamping fastener can comprise a head having a diameter greater than a diameter of the third aperture and a threaded end and the first aperture comprises an inner thread complementary to the threaded end.

In accordance with a more detailed aspect, the precision adjustment fastener mechanism can further comprise a lower spherical washer disposed between the base and the locking push-pull fastener and an upper spherical washer disposed between the head and the locking push-pull fastener.

In accordance with a more detailed aspect, the clamping fastener can further comprise a port extending from the head to the one or more inner threads of the platform.

In accordance with a more detailed aspect, the precision adjustment fastener mechanism can further comprise a flat washer and a spring washer. The flat washer can be located between the head and the spring washer and the spring washer can be located between the flat washer and the upper spherical washer.

Also disclosed is a method for securing a platform. The method comprises turning a locking push-pull fastener assembly within a threaded aperture of a platform to position the platform relative to a base and applying an axial force to the locking push-pull fastener to compress a region of the locking push-pull fastener to move a first thread portion axially towards a second thread portion to bind an outer thread of the locking push-pull fastener to an inner thread of the platform to axially lock the sleeve relative to the platform. In the method the locking push-pull fastener comprises a sleeve having a first threaded portion and a second threaded portion separated by an axial displacement portion having a lower stiffness than the first threaded portion and the second threaded portion.

In accordance with a more detailed aspect, the threaded fastener can extend through the locking push-pull fastener into a threaded aperture of the base and applying an axial force can comprise tightening the threaded fastener.

To further describe the present technology, examples are now provided with reference to the figures. FIG. 1 illustrates a platform mounting system 4 comprising a platform 10 mounted to a base 12 by three precision adjustment fastener mechanisms 6 in accordance with an example of the present disclosure. As will be described in greater detail, the precision adjustment fastener mechanisms 6 secure the platform 10 to the base 12 and allow for selective, precision adjustment of the position of the platform 10 relative to the base 12. An operator can adjust the precision adjustment fastener mechanisms 6 to move the platform 10 to a desired configuration and then lock the precision adjustment fastener mechanisms 6 in the desired configuration to prevent further movement of the platform 10 relative to the base 12. The operator may adjust both the distance between the platform 10 and the base 12 and the angle of the platform 10 relative to the base 12 by individually adjusting each of the precision adjustment fastener mechanisms 6. For example, adjustment of a single precision adjustment fastener mechanisms 6 can affect the angle of the platform 10 relative to the base 12, while adjustment of three precision adjust fastener mechanisms 6 can affect the distance between the platform 10 and the base 12.

In some examples, the base 12 can be a structure for supporting a sensor (e.g., an optical sensor) and the platform can be an optical element, a detector assembly, a precision steering mirror mechanism, the strut ends of a bipod assembly or any item needing to be precisely aligned and the rigidized relative to a base, be the in a sensor assembly or any other application.

Figure 2:
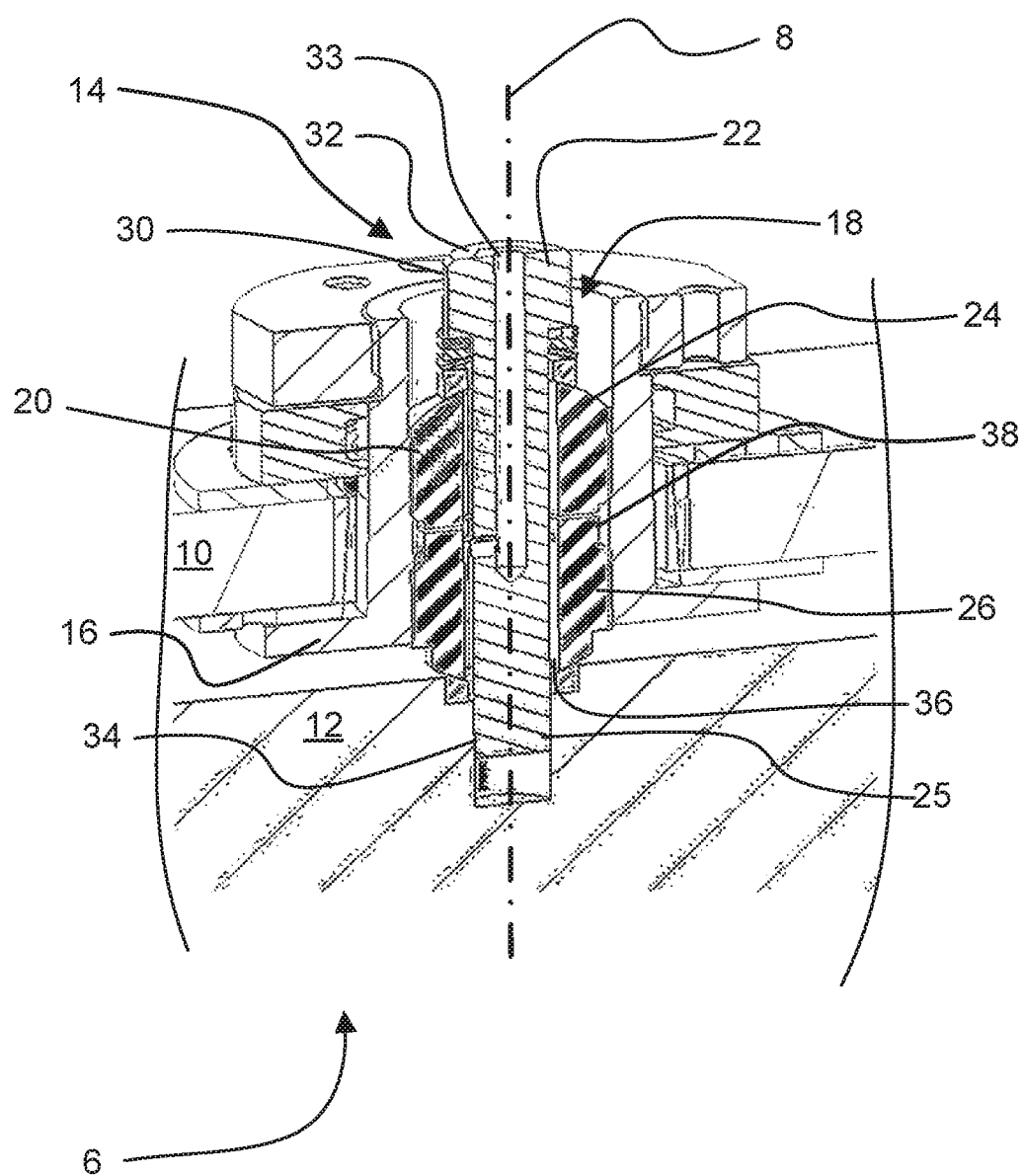
FIG. 2 illustrates a cross-sectional view of a precision adjustment fastener mechanism compatible with the example of FIG. 1.

FIG. 2 illustrates a cross-section of one of the exemplary precision adjustment fastener mechanisms 6 illustrated in FIG. 1 suitable for use in the platform mounting system 4 of FIG. 1. As shown, the exemplary precision adjustment fastener mechanism 6 comprises a locking push-pull fastener assembly 14 securing the platform 10 to the base 12. The locking push-pull fastener assembly 14 comprises a clamping fastener 22 and a sleeve 20 operable with the clamping fastener 22, In some examples, such as in the example shown, which is not intended to be limiting in any way, the clamping fastener 22 can comprise a threaded fastener having a first end 30 with an enlarged head 32 and a second end 34 having threads for interfacing with the base 12. The enlarged head 32 can have a size and shape configured to receive a torqueing tool. For example, the enlarged head 32 can have a hexagonal socket sized and shaped to receive a hex key, or in another example, the enlarged head 32 can have a hexagonal outer shape sixed and shaped to receive a common wrench or socket tool. As will be appreciated by those skilled in the art, other configurations of the head 32 are contemplated for use with different types of torqueing tools. The sleeve 20 has an aperture 36 extending axially along an axis 8 and comprises a first portion 24, a second portion 28, and an axial displacement portion 38 located between the first portion 24 and the second portion 26. The clamping fastener 22 can be located within the aperture 36 and can extend axially through the sleeve 20. The axial displacement portion 38 facilitates movement of the first portion 24 relative to the second portion 26 along the axis 8. The first portion 24 and the second portion 26 each have an outer surface having one or more outer threads operable to interface with one or more inner threads of the platform 10. The axial displacement portion 38 connects the first portion 24 to the second portion 26 and facilitates relative axial displacement between the first portion 24 and the second portion 26 while coupling relative rotational movement of the first portion 24 and the second portion 26.

In use, the second end 34 of the clamping fastener 22 can be coupled to the base 12. In some examples, the base 12 can have an internally threaded socket 25 having an inner thread for receiving the second end 34 of the clamping fastener 22. A user can position the clamping fastener 22 to extend through the aperture of the sleeve 20 and secure the clamping fastener 22, and thus the sleeve 20, to the base 12 by threading the clamping fastener 22 into the inner thread of the socket 25. The first end 30 of clamping fastener 22 biases the sleeve 20 towards the base 12 in an axial direction, such that the sleeve 20 is fixed axially but remains free to rotate around clamping fastener 22 about axis 8.

The platform 10 can comprise an aperture 18 having one or more inner threads for receiving the sleeve 20. In some examples, such as the example of FIG. 2, the platform 10 can comprise a sleeve interface 16 and the aperture 18 can be formed in the sleeve interface 16. The sleeve interface 16 can be secured within the platform 10 by conventional means including, but not limited to, screws, bolts, a press fit within the aperture, weldments, and adhesives. The one or more inner threads of the aperture 18 can interface with the one or more external threads of the first and second portions 24, 26 of the sleeve 20. For example, the one or more inner threads of the aperture 18 can have the same pitch, included angle, and pitch diameter as the one or more outer threads of the first and second portions 24, 26. Thus, the platform 10 can be secured to the base 12 by threading the one or more outer threads of the sleeve 20 into the one or more inner threads of the aperture 18. As an operator rotates the sleeve 20 within the aperture 18, the interaction of the one or more inner threads of the aperture 18 and the one or more outer threads of the sleeve 20 can cause the platform 10 to move towards or away from the base 12 depending on the direction the operator rotates the sleeve 20.

The clamping fastener 22 can further comprise a port 33 extending from the enlarged head 32 to a lateral surface of the clamping fastener 22. The port 33 can allow a thread locking compound to be injected into the axial displacement portion 38 of the sleeve 20. At least one physical feature in the axial displacement portion 38 of the sleeve 20 provides a fluid passage from the aperture 36 to the one or more outer threads of the sleeve 20. For example, axial cuts (described in FIG. 7-12) can provide fluid communication between the aperture 36 and the one or more outer threads.

Figure 3:
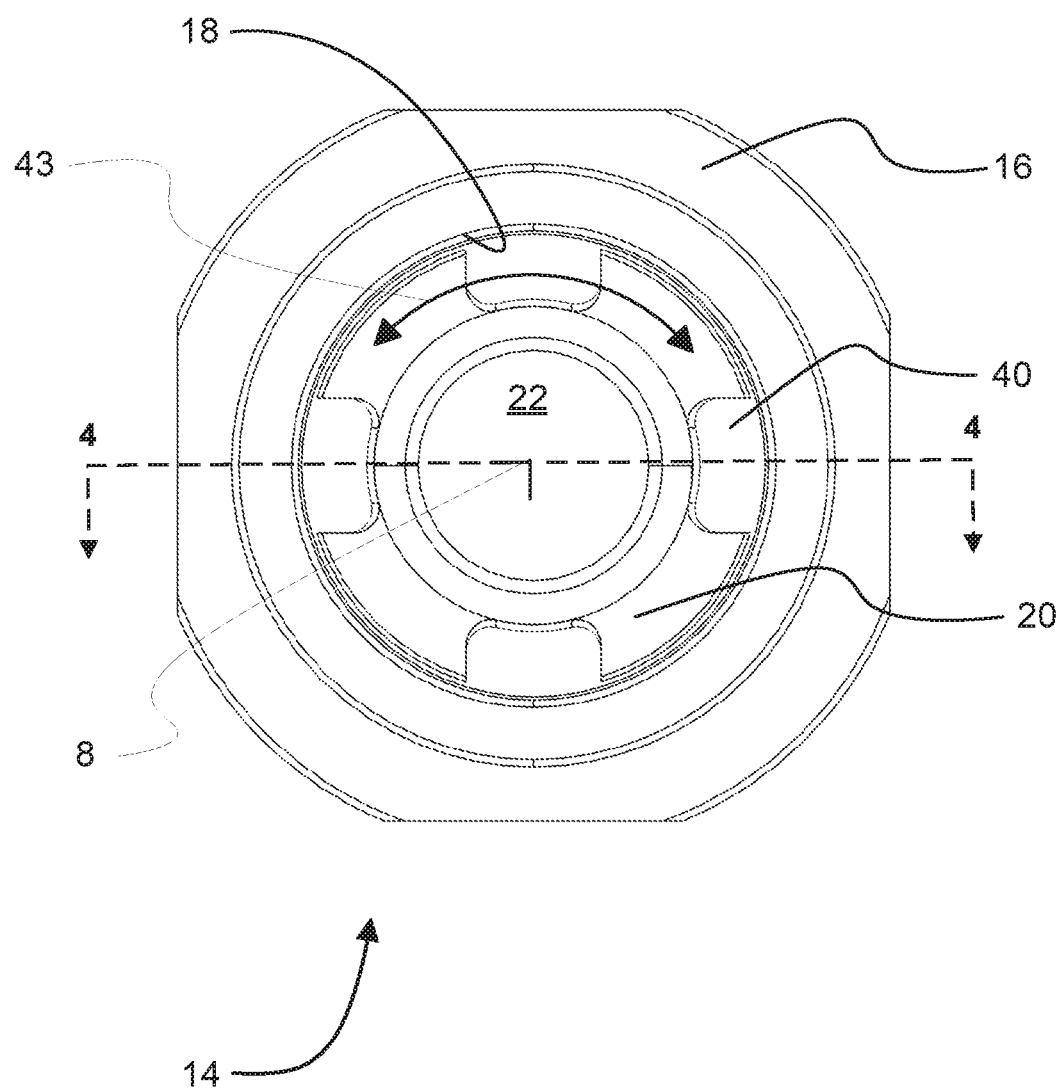
FIG. 3 illustrates a top end view of a locking push-pull fastener assembly and a sleeve interface of the precision adjustment fastener mechanism of FIG. 2.

FIG. 3 illustrates a locking push-pull fastener assembly 14 and a sleeve interface 16 suitable for use in the precision adjustment fastener mechanism 6 of FIG. 2. The locking push-pull fastener assembly 14 can be positioned within the aperture 18 of the sleeve interface 16. The sleeve 20 and the clamping fastener 22 are each rotatable about axis 8 (the axis extending into the page). An operator can tighten or loosen the clamping fastener 22 relative to a base, such as base 12 of FIG. 1, by rotating the clamping fastener 22 (as shown by arrows 43) with a second end threaded into a threaded socket of the base 12. An operator can rotate the sleeve 20 about the axis 8 to raise or lower the sleeve interface 16 (into or out of the page) relative to the base 12. Since the sleeve interface 16 can be fixed to the platform 10, relative motion between the sleeve interface 16 and the platform 10 can translate to the platform 10. The sleeve 20 can have physical tool interfaces or interface features formed thereon, such as recesses, protrusions, and flats to facilitate rotation of the sleeve 20 by an operator using a tool that interfaces with such tool interface features. For example, the first portion 24 of the sleeve 20 of FIG. 4 has four recesses 40 for interfacing with an operator tool configured to interface with the four recesses 40.

Figure 4:
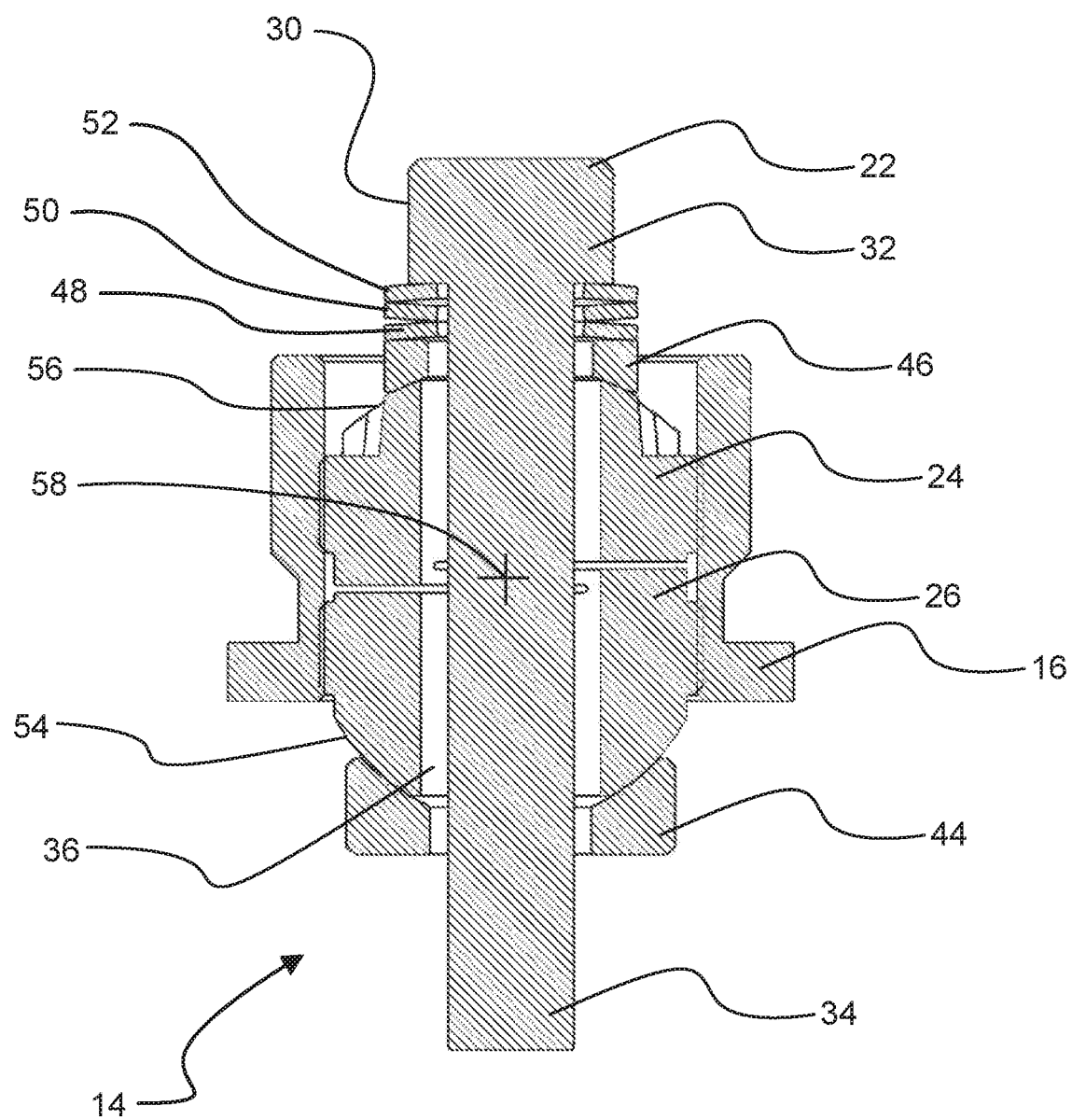
FIG. 4 illustrates a cross-sectional view of the locking push-pull fastener assembly and the sleeve interface of FIG. 3 taken about line 4-4 of FIG. 3.

FIG. 4 illustrates a cross section of the locking push-pull fastener assembly 14 and the sleeve interface 16 of FIG. 3 taken about line 4-4 of FIG. 3. With reference to FIGS. 3 and 4, the first portion 24 and the second portion 26 of the sleeve 20 can each have a spherical end surface 54, 56. The spherical end surfaces 54, 56 can have a coincident center 58. The locking push-pull fastener assembly 14 can further comprise washers positioned about clamping fastener 22. In the example locking push-pull fastener assembly 14 of FIG. 4, the washers include a first spherical washer 46, a first spring washer 48, a second spring washer 50, and a flat washer 52 located between the first end 30 of the clamping fastener 22 and the first portion 24 of the sleeve 20. A second spherical washer 44 can be located between the second end 34 of the clamping fastener 22 and the second portion 26 of the sleeve 20. The first spherical washer 46 and the second spherical washer 44 can interface with the spherical end surfaces 54, 56 of the sleeve 20 to facilitate angular movement of the sleeve 20 relative to a base. Example spring washers can comprise Belleville washers, or other types, as will be recognized by those skilled in the art. In other examples, the washers can be present in a different arrangement. For example, flat washers can replace the first spring washer 48 and the second spring washer 50, and a spring washer can replace the flat washer 52.

The first end 30 of the clamping fastener 22 can bias the sleeve 20 axially towards a base and can provide a compressive force between the first portion 24 and the second portion 26 of the sleeve 20. Flat washers, (e.g., the flat washer 52) can facilitate rotational movement of clamping fastener 22 by reducing friction between the enlarged head 32 of the clamping fastener 22 and the sleeve 20. Spring washers (e.g., the first and second spring washers 48, 50) can provide a preload to the sleeve 20 as an operator tightens the clamping fastener 22. As the preload increases as a result of the operator tightening the clamping fastener 22, the clamping fastener biases the first portion 24 towards the second portion 26 compressing the axial displacement portion 38 and allowing the first and second portions 24, 26 to displace towards one another. It is noted that, for clarity purposes, the sleeve 20 and the overall locking push-pull fastener assembly 14 is shown if FIG. 4 without threads, although such are intended to be present as discussed herein.

Figure 5A:
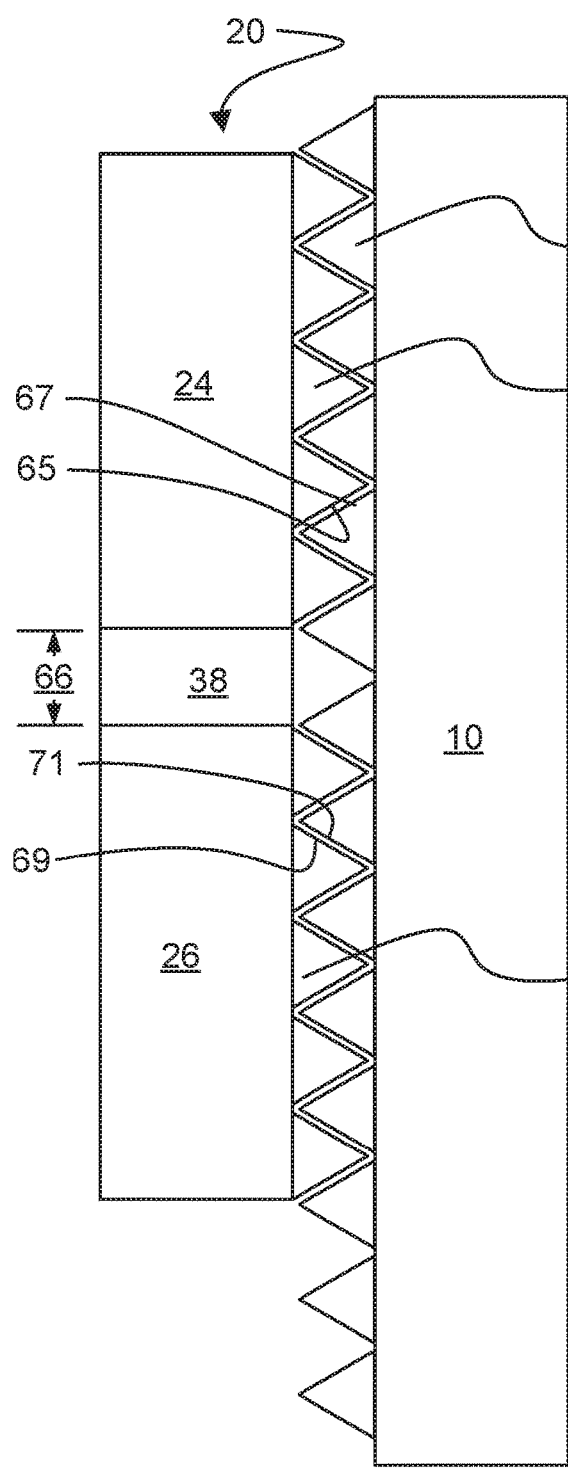
FIG. 5a illustrates a schematic view of threads of the locking push-pull fastener assembly and the sleeve interface of FIG. 3 in an unlocked state.
Figure 5B:
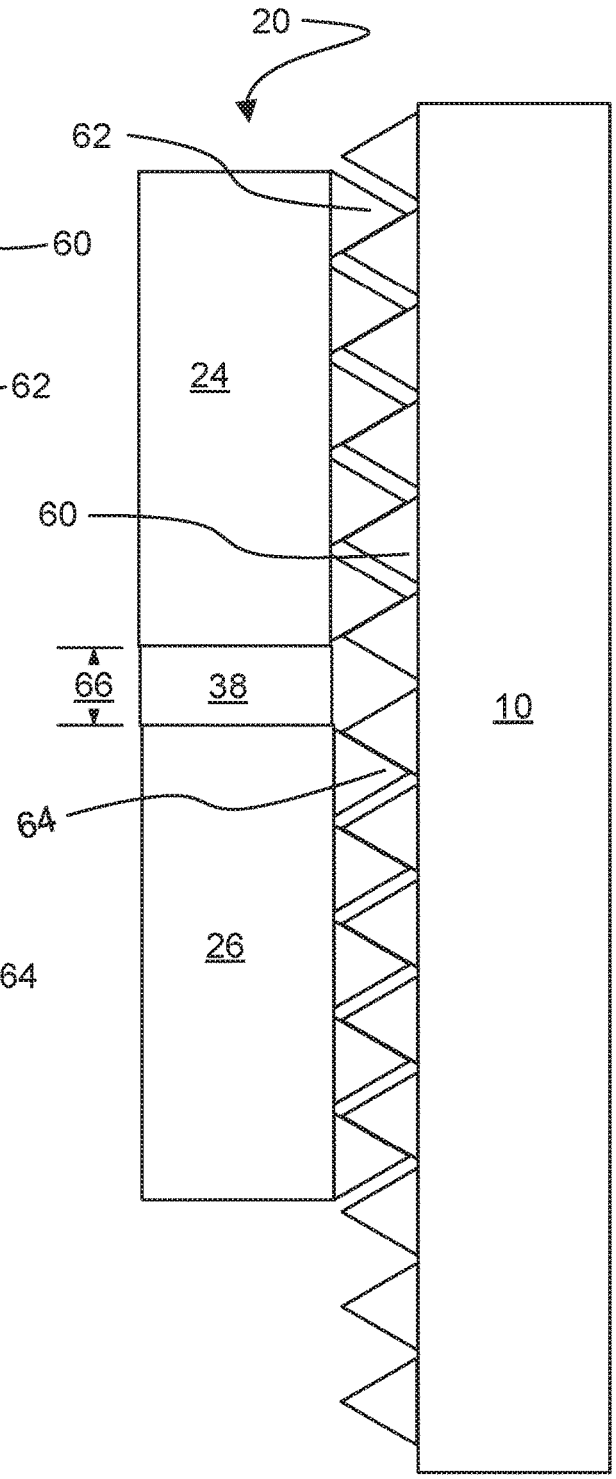
FIG. 5b illustrates a schematic view of threads of the locking push-pull fastener assembly and the sleeve interface of FIG. 3 in a locked state.

FIGS. 5a and 5b are example schematics illustrating an example of inner threads 60 of a platform 10 interacting with outer threads 62, 64 of the first and second portions 24, 26 of a sleeve 20. FIG. 5a shows the sleeve 20 in a relaxed state, such as when an operator is threading the sleeve 20 into a platform 10, or when the operator is adjusting the position of the platform 10 relative to a base. Outer threads 62, 64 of the sleeve 20 interface with inner threads 60 of platform 10 and move relative to one another to effectuate movement of platform 10. As discussed previously, a clamping fastener (not shown) fixes the axial position of the sleeve 20 relative to the base and rotation of the sleeve 20 and the resulting interaction of the outer threads 62, 64 of the sleeve 20 and the inner threads 60 of the platform 10 cause the platform 10 to move relative to the base.

When the platform 10 is at the desired orientation relative to the base, an operator can tighten the clamping fastener, such as the clamping fastener 22 of FIG. 2, compressing the axial displacement portion 38 and moving the first portion 24 towards the second portion 26 as shown in FIG. 5b. In FIG. 5b, the axial displacement portion 38 of the sleeve 20 is compressed and the first portion 24 and the second portion 26 have a decreased separation distance 66 relative to the separation distance 66 of FIG. 5a. The outer threads 62 of the first portion 24 are displaced downward relative to the inner threads 60 and the outer threads 64 of the second portion 26 are displaced upwards relative to the inner threads 60. A lower surface 65 of the outer threads 62 contacts an upper surface 67 of inner threads 60 and an upper surface 69 of outer threads 64 contact a lower surface 71 of inner threads 60, binding the inner threads 60 to the outer threads 62, 64 resulting in an axial lock up of the sleeve 20 within the platform 10. The binding surfaces effectively lock the platform 10 to the sleeve 20 in six degrees of freedom when the clamping fastener is preloaded to compress the axial displacement portion 38 as shown in FIG. 5b. With the sleeve 20 unable to move and being coupled to the base by the clamping fastener, the platform 10 is effectively coupled to the base in a locked configuration. When further adjustment is required, an operator can loosen the clamping fastener 22 to remove the preload and return the sleeve 20 to the configuration shown in FIG. 5a. The operator can then rotate the sleeve 20 again to further adjust the orientation of the platform 10.

Figure 6:
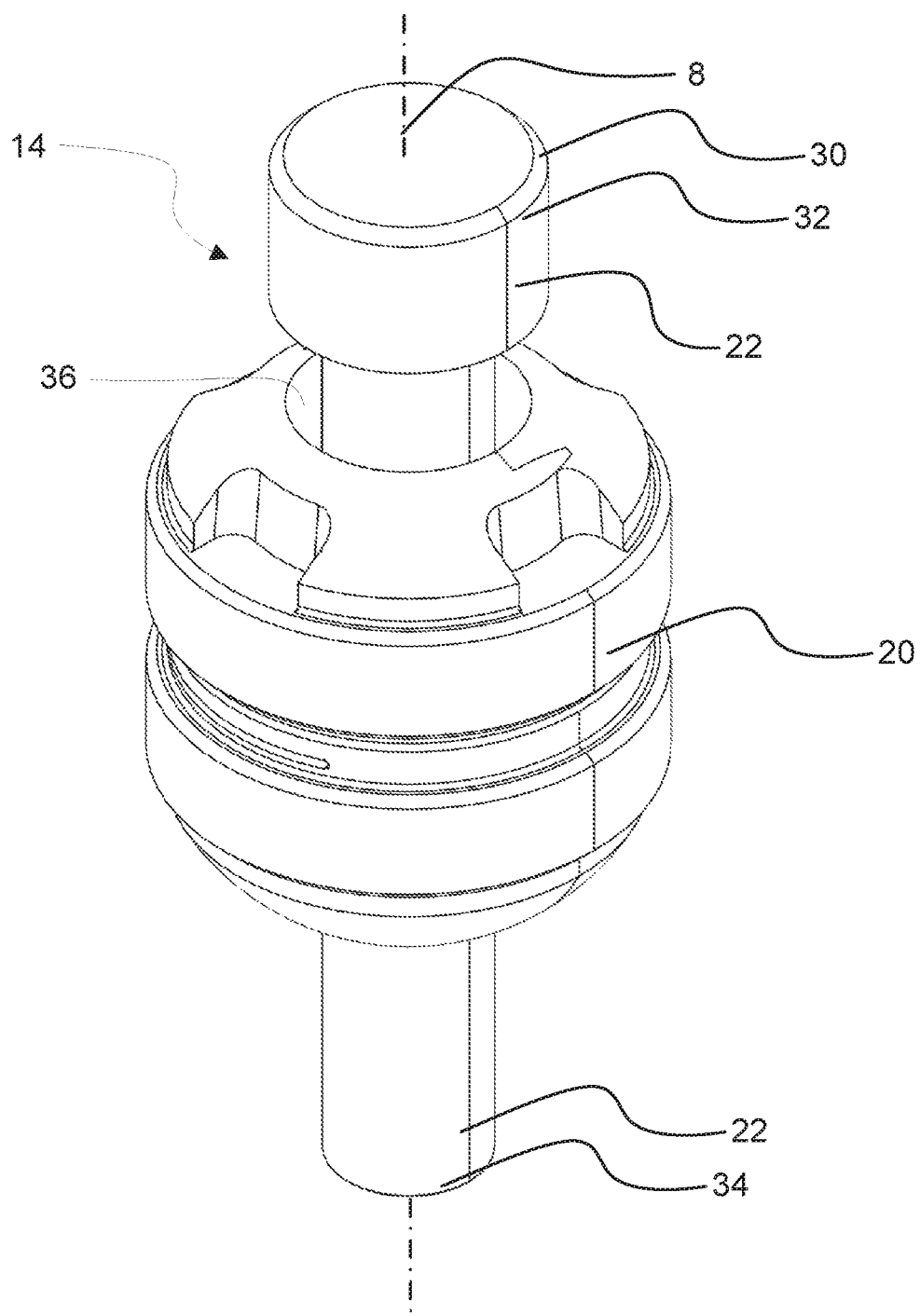
FIG. 6 illustrates an isometric view of the locking push-pull fastener assembly and the sleeve of FIG. 3.

FIG. 6 illustrates, in part, the locking push-pull fastener assembly 14 of FIG. 3. The clamping fastener 22 passes through the aperture 36 of the sleeve 20 and can extend axially from the first portion 24 and the second portion 26 of the sleeve 20. The first end 30 of the clamping fastener 22 can have an enlarged head 32. The enlarged head 32 can have a diameter greater than a diameter of the aperture 36 of the sleeve 20. The second end 34 of the clamping fastener 22 is configured to couple to a base. In some examples, the second end 34 has an outer thread and an operator can secure the clamping fastener by threading second end 34 in a threaded socket of the base. An operator applying torque to the enlarged head 32 can cause the second end 34 to thread into the threaded socket. Further tightening of the second end 34 into the threaded socket will cause the enlarged head 32 to bias (apply a force to) the sleeve 20 (e.g., through spring washers disposed between the head 32 and the sleeve 20) towards the base, wherein eventually the sleeve 20 is caused to contact the base, or any washers such as the spherical washers of FIG. 3. Continued tightening of clamping fastener 22 can cause spring washers, such as spring washers 48, 50 of FIG. 3, to compress under the enlarged head 32 and cause the axial displacement portion 38 of sleeve 20 to compress axially, as shown in FIG. 5b.

Figure 7:
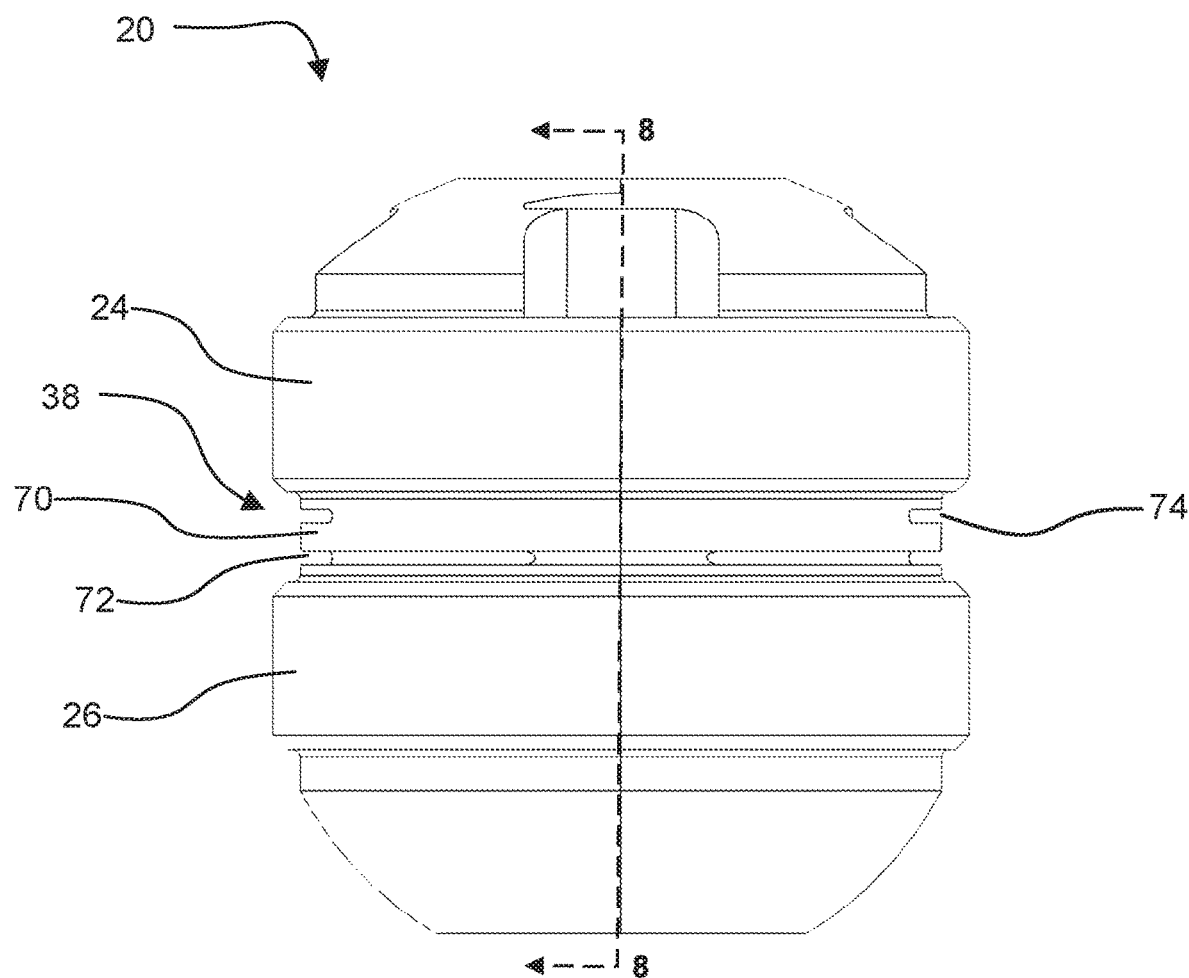
FIG. 7 illustrates a side view of the sleeve of the locking push-pull fastener assembly of FIG. 3.

FIG. 7 illustrates the sleeve 20 of the locking push-pull fastener assembly 14 of FIG. 6 (again without threads, as is the case with the various example sleeves discussed below). The axial displacement portion 38 comprises a portion of the sleeve 20 between the first portion 24 and the second portion 26 that facilitates relative movement between the first and second portions 24, 26. The axial displacement portion 38 can have a circumferential recess 70 in an outer surface of the sleeve 20. The recess 70 can extend to a depth of the threads of the first and second portions 24, 26. The recess 70 facilitates the axial displacement portion 38 to displace axially when compressed without interacting with the inner threads of an aperture of the platform. Thus, the axial displacement portion 38 can experience a change in height without the inner threads of the aperture of the platform interfering. The axial displacement portion 38 can further comprise a physical feature to reduce the axial stiffness of the axial displacement portion 38 relative to the axial stiffness of the first and second portions 24, 26 while maintaining rotational stiffness between the first and second portions 26, 28.

Figure 8:
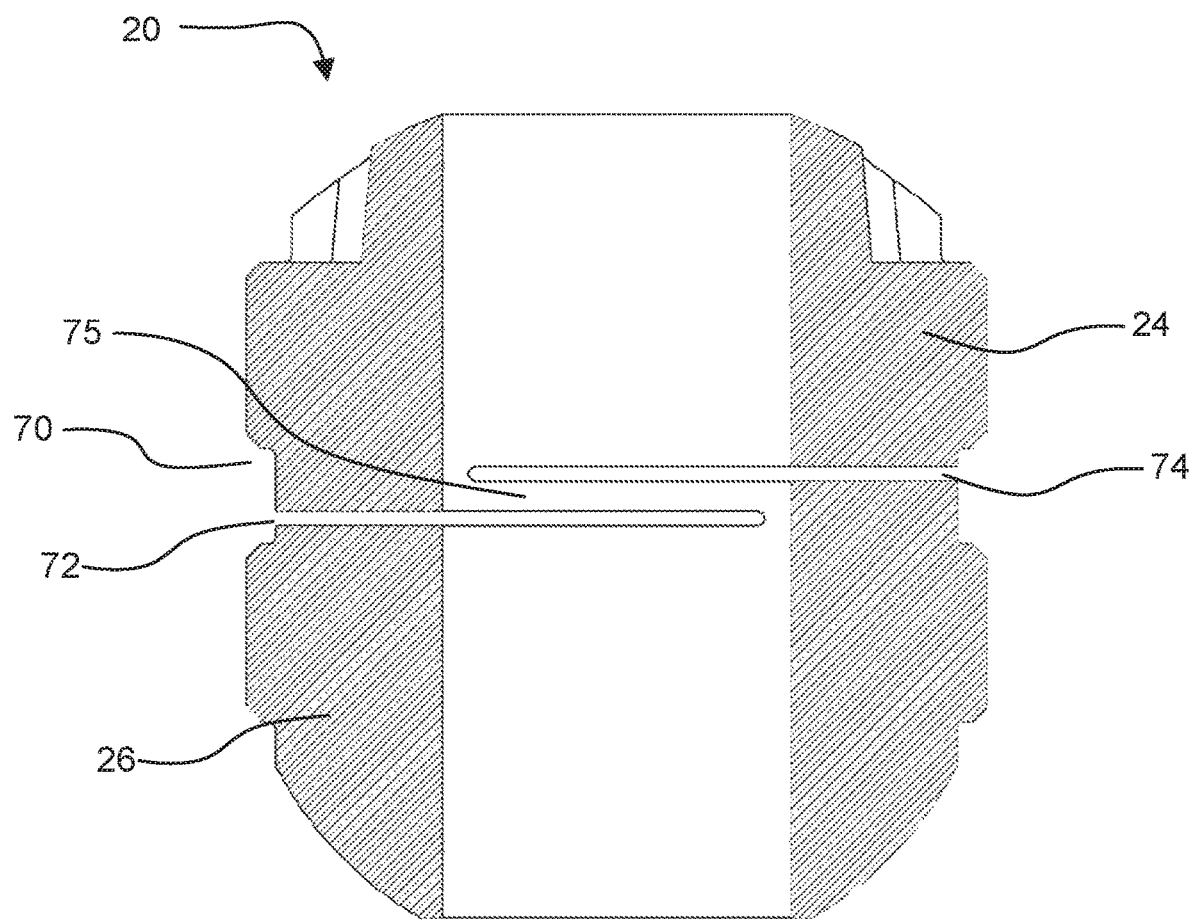
FIG. 8 illustrates a cross-sectional view of the sleeve of the locking push-pull fastener assembly of FIG. 3 taken about line 8-8 of FIG. 7.

In the example of FIG. 7, the physical feature configured to lower or reduce the axial stiffness of axial displacement portion 38 relative to that of the first and second portions 24, 26 comprises two lateral cuts 72, 74 that extend laterally through the sleeve 20 along a plane perpendicular to an axis of the sleeve 20. FIG. 8 illustrates a cross-section of the sleeve 20 of FIG. 7, showing the lateral cuts 72, 74 extending laterally through the sleeve 20. With reference to FIGS. 7 and 8, the lateral cuts 72, 74 are displaced from one another axially and overlap circumferentially. The lateral cuts 72, 74 result in a thin strip 75 of material (i.e., a flexure) that can deform axially through torsion rather than compression, thereby reducing the axial stiffness of the axial displacement portion 38 while maintaining rotational stiffness. When an operator applies a compressive force to the sleeve 20 via a clamping fastener (e.g., clamping fastener 22 of FIG. 6), the first portion 24 and the second portion 26 remain substantially not deformed or undeformed (not deformed) while the axial displacement portion 38 experiences a reduction in height. In some examples, the lateral cuts 72, 74 can be formed using electrical discharge machining. In some examples, the lateral cuts can be between 0.005 and 0.015 inches thick and the axial spacing between lateral cuts 72, 74 can be between 0.010 and 0.030 inches thick. However, these are not meant to be limiting in any way.

FIGS. 9-14 illustrate several different example sleeves that are similar in many respects, and that perform similarly, to the sleeve 20 discussed above and shown in FIGS. 1-8. Indeed, the sleeve operable with the clamping fastener as disclosed herein can comprise many different configurations, and can have similar elements and features, and can function in a similar manner as the sleeve 20 of FIGS. 1-8. As such, the discussion above is incorporated here where applicable with an understanding that the sleeve 20 differs from the sleeves discussed below, as indicated herein, and as will be appreciated by those skilled in the art.

Figure 9:
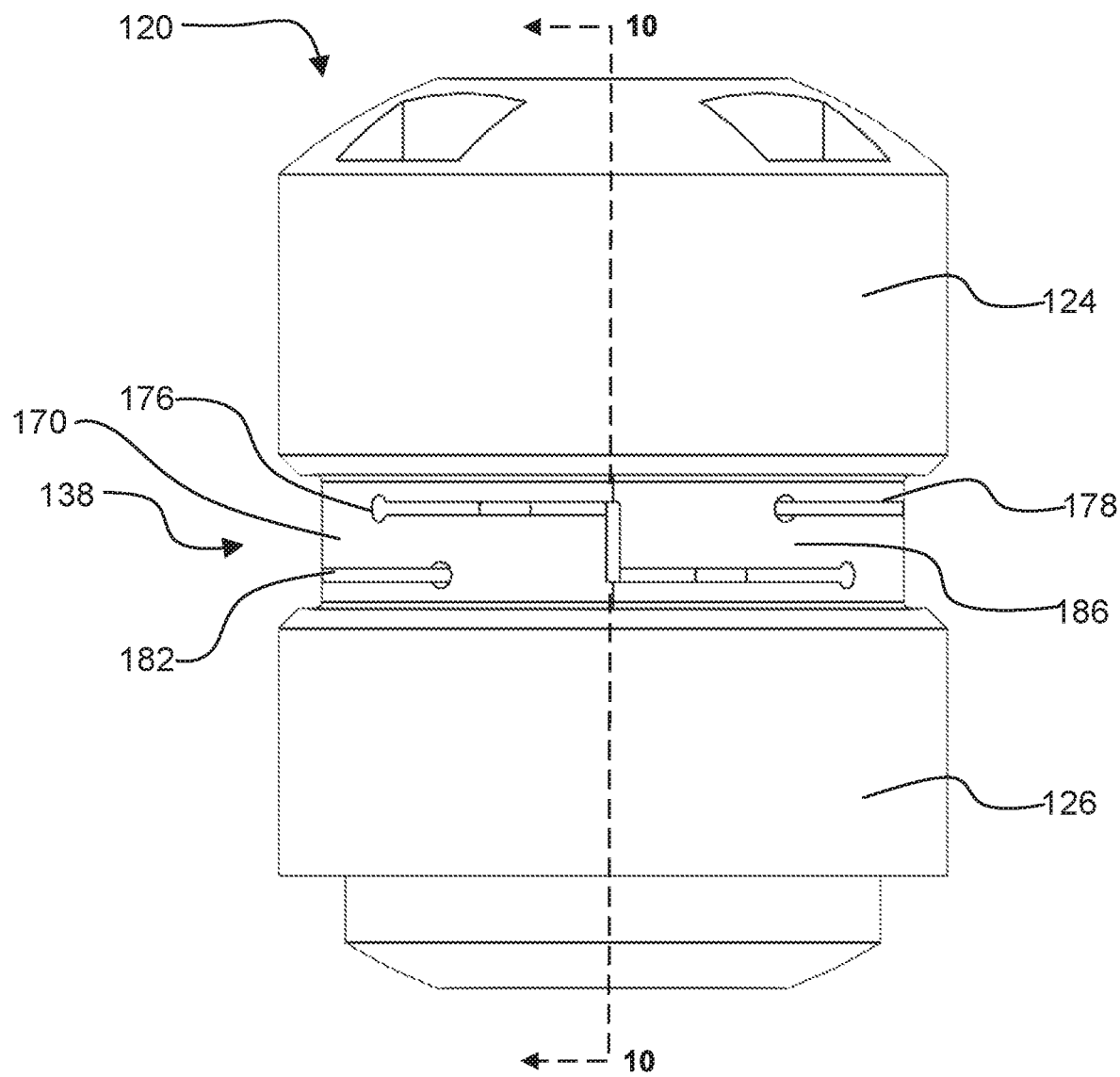
FIG. 9 illustrates a side view of a sleeve in accordance with an example of the present disclosure.
Figure 10:
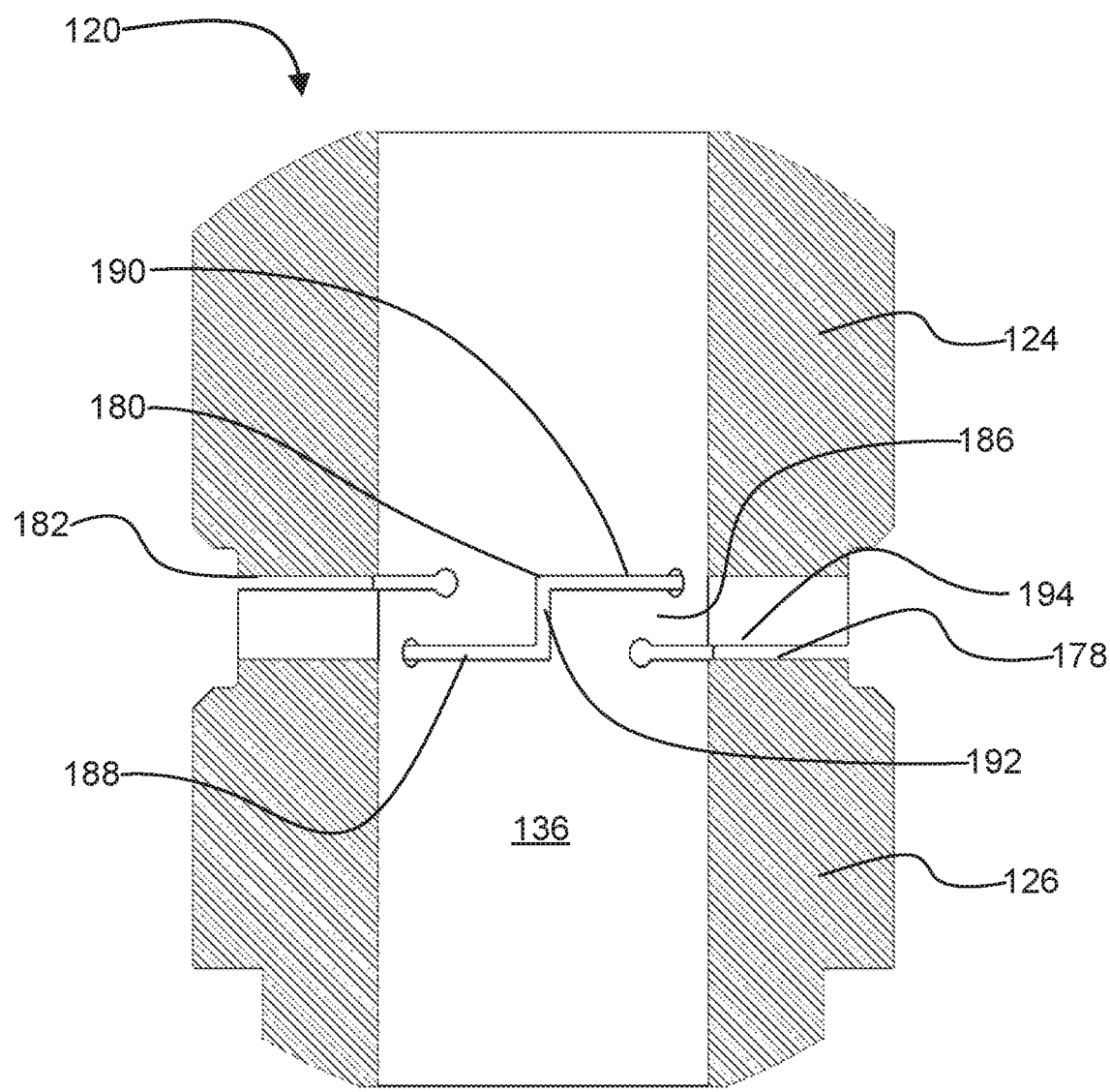
FIG. 10 illustrates a cross-sectional view of the sleeve of FIG. 9 taken about line 10-10 of FIG. 9.

FIG. 9 illustrates another example of a sleeve 120 that can be operable with the locking push-pull fastener assembly 14 of FIG. 6. In this example, the sleeve 120 can comprise a first portion 124, a second portion 126, and an axial displacement portion 138 located between the first portion 124 and the second portion 126. FIG. 10 illustrates a cross section of the sleeve 120 of FIG. 9. With reference to FIGS. 9 and 10, the axial displacement portion 138 of the sleeve 120 comprises a circumferential recess 170 and four radial cuts 176, 178, 180, 182 extending from an aperture 136 to an outer surface of the sleeve 120. Each of the radial cuts 176, 178, 180, 182 comprises a first portion (e.g., see first portion 188 of radial cut 180) and a second portion (e.g., see second portion 190 of radial cut 180) that extends circumferentially (in a lateral, circumferential direction), and a third portion (e.g., see third portion 192 of radial cut 180) that extends axially (in an axial direction) between the first portion and the second portion, such that the first portion and the second portion are axially offset from one another. Adjacent radial cuts, such as radial cuts 178, 182, can overlap circumferentially. For example, the first portion 194 of radial cut 178 can overlap with the second portion 190 of radial cut 180 in a circumferential direction. The radial cuts 176, 178, 180, 182 result in portions 186 of material (i.e., a flexure) that can deform through torsion rather than compression, thereby reducing the axial stiffness of the axial displacement portion 138 while maintaining rotational stiffness. When an operator applies a compressive force to the sleeve 120 (e.g., via a clamping fastener (e.g., clamping fastener 22 of FIG. 7), the first portion 124 and the second portion 126 remain substantially not deformed or undeformed while the axial displacement portion 138 experiences a reduction in height.

Figure 11:
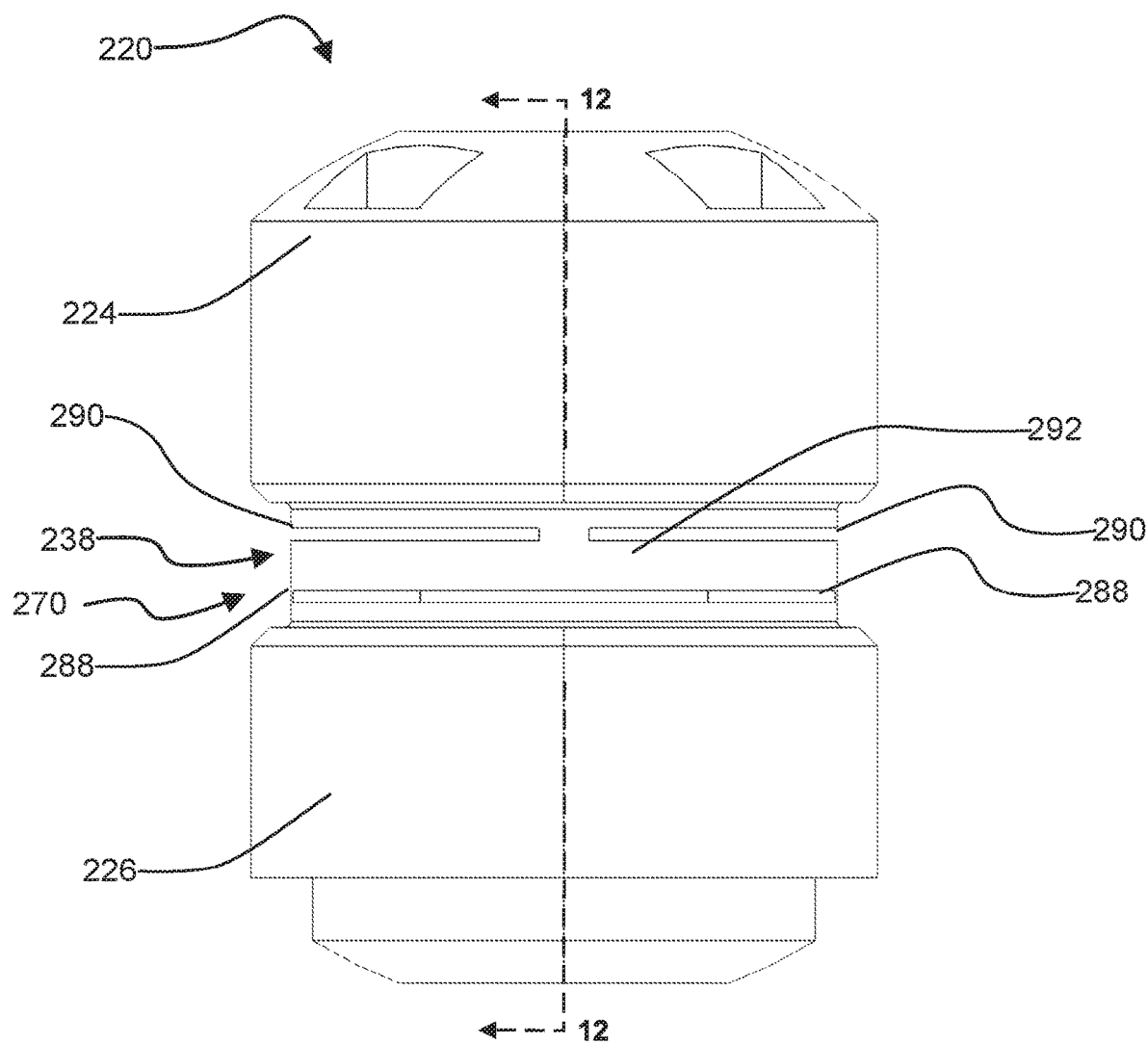
FIG. 11 illustrates a side view of a sleeve in accordance with an example of the present disclosure.
Figure 12:
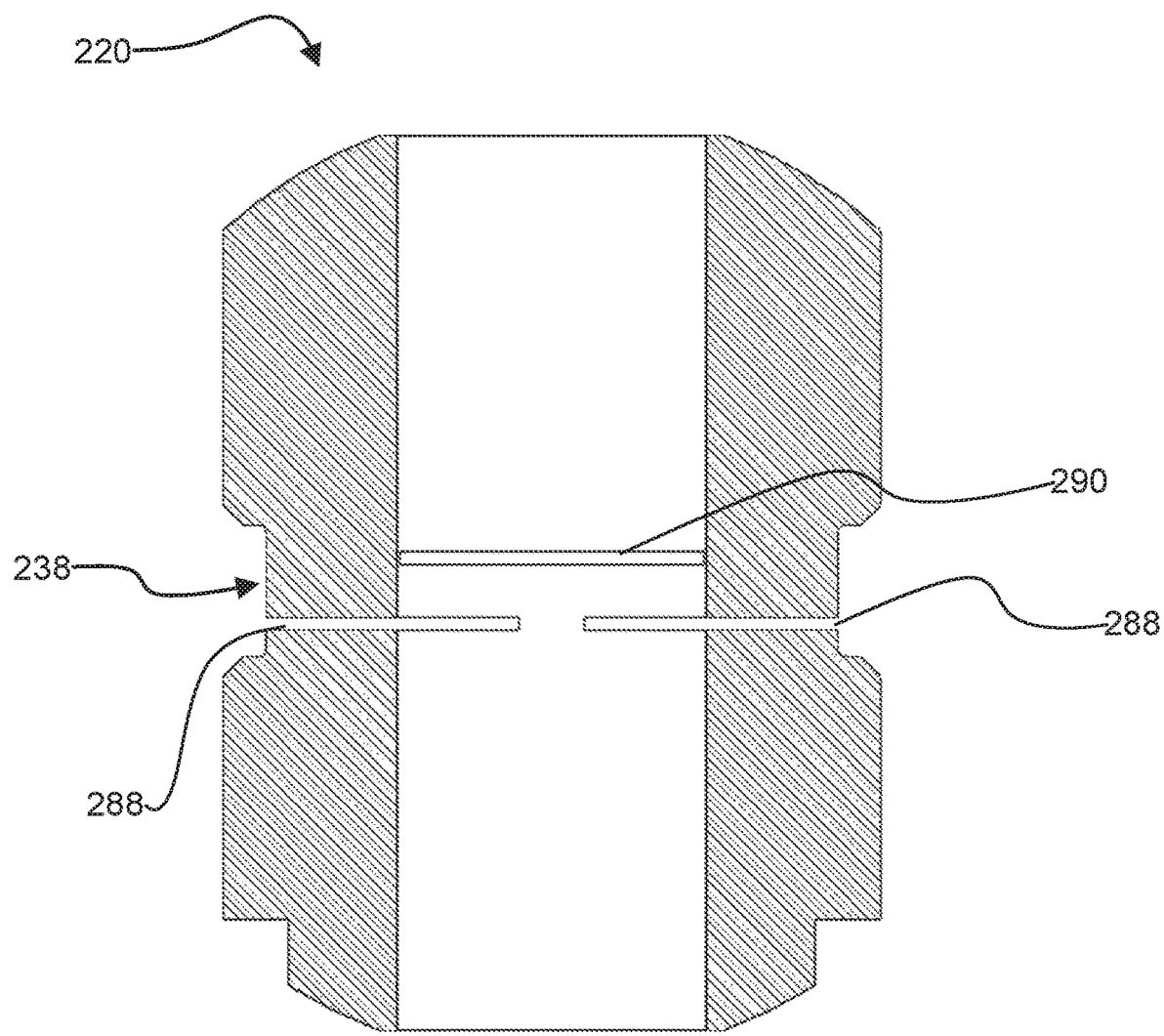
FIG. 12 illustrates a cross-sectional view of the sleeve of FIG. 11 taken about line 12-12 of FIG. 11.

FIG. 11 illustrates another example of a sleeve 220 that can be operable with the locking push-pull fastener assembly 14 of FIG. 6. In this example, the sleeve 220 can comprise a first portion 224, a second portion 226, and an axial displacement portion 238 between the first and second portions 224, 226. FIG. 12 illustrates a cross-section of the sleeve 220 of FIG. 11. With reference to FIGS. 11 and 12, the axial displacement portion 238 comprises a circumferential recess 270 and two sets 288, 290 of two lateral cuts with the sets 288, 290 being offset from one another in a longitudinal direction and offset radially by ninety degrees. FIG. 12 shows the sets 288, 290 of lateral cuts extending laterally through the sleeve 220. The sets 288, 290 overlap each other circumferentially resulting in strips 292 of material (i.e., flexures) that can deform through torsion rather than compression, thereby reducing the axial stiffness of the axial displacement portion 238, while maintaining rotational stiffness. When an operator applies a compressive force to the sleeve 220 (e.g., via a clamping fastener (e.g., clamping fastener 22 of FIG. 7)), the first portion 224 and the second portion 226 remain substantially undeformed while the axial displacement portion 238 experiences a reduction in height.

In some examples, each of the lateral cuts of the two set 288, 290 of lateral cuts can be between 0.005 and 0.015 inches thick and the axial spacing between each set 288, 290 of lateral cuts can be between 0.010 and 0.030 inches thick. In some examples, each cut with a set of lateral cuts can be separated laterally by a distance of between 0.030 and 0.050 inches. Of course, these are not intended to be limiting in any way as will be appreciated by those skilled in the art.

Figure 13:
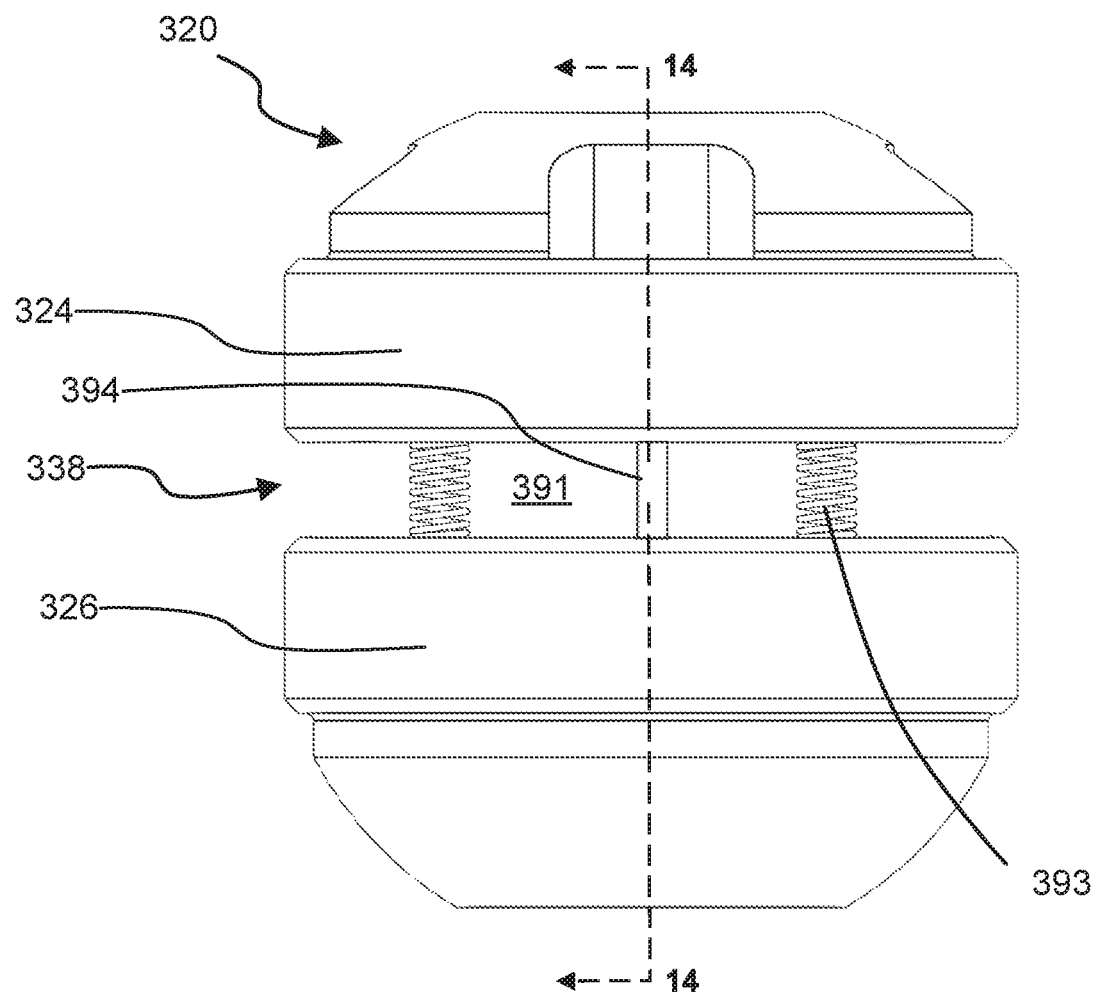
FIG. 13 illustrates a side view of a sleeve in accordance with an example of the present disclosure.
Figure 14:
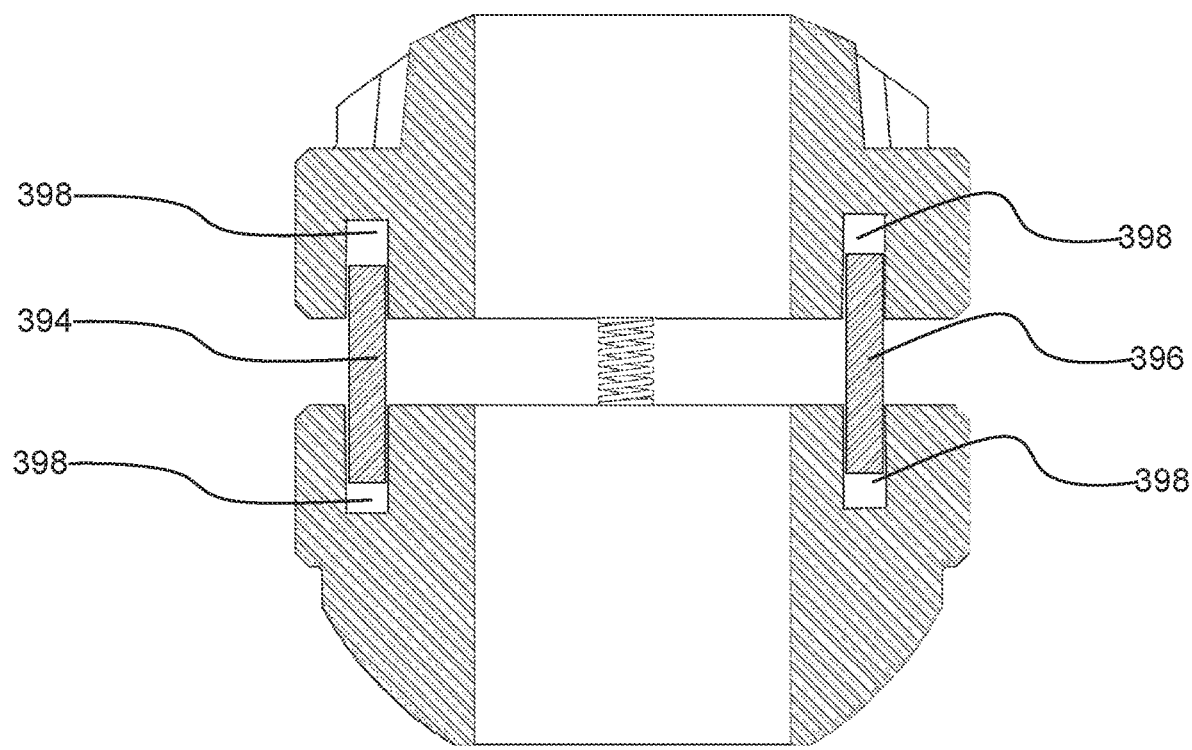
FIG. 14 illustrates a cross-sectional view of the sleeve of FIG. 13 taken about line 14-14 of FIG. 13.

FIG. 13 illustrates another example of a sleeve 320 that can be operable with the locking push-pull fastener assembly 14 of FIG. 6. In this example, the sleeve 320 can comprise a first portion 324, a second portion 326, and an axial displacement portion 338. FIG. 14 illustrates a cross-section of the sleeve 320 of FIG. 13. With reference to FIGS. 13 and 14, the axial displacement portion 338 comprises a space 391 between the first portion 324 and the second portion 326, and pins 394, 396 slidably located within sockets 398 in the first portion 324 and the second portion 326. The pins 394, 396 transmit torque from the first portion 324 to the second portion 326, while facilitating axial movement between the first portion 324 and the second portion 326. One or more biasing members, such as a springs 393, can be located between the first portion 324 and the second portion 326 to provide an offset between the first portion 324 and the second portion 326. The springs 393 can have a lower stiffness than the solid material of the sleeve 320 resulting in a lower axial stiffness in the axial displacement portion 338 relative to the first portion 324 and the second portion 326. When an operator applies a compressive force to the sleeve 320 (e.g., via a clamping fastener (e.g., clamping fastener 22 of FIG. 7)), the first portion 324 and the second portion 326 remain substantially undeformed while the axial displacement portion 338 experiences a reduction in height.

Figure 15:
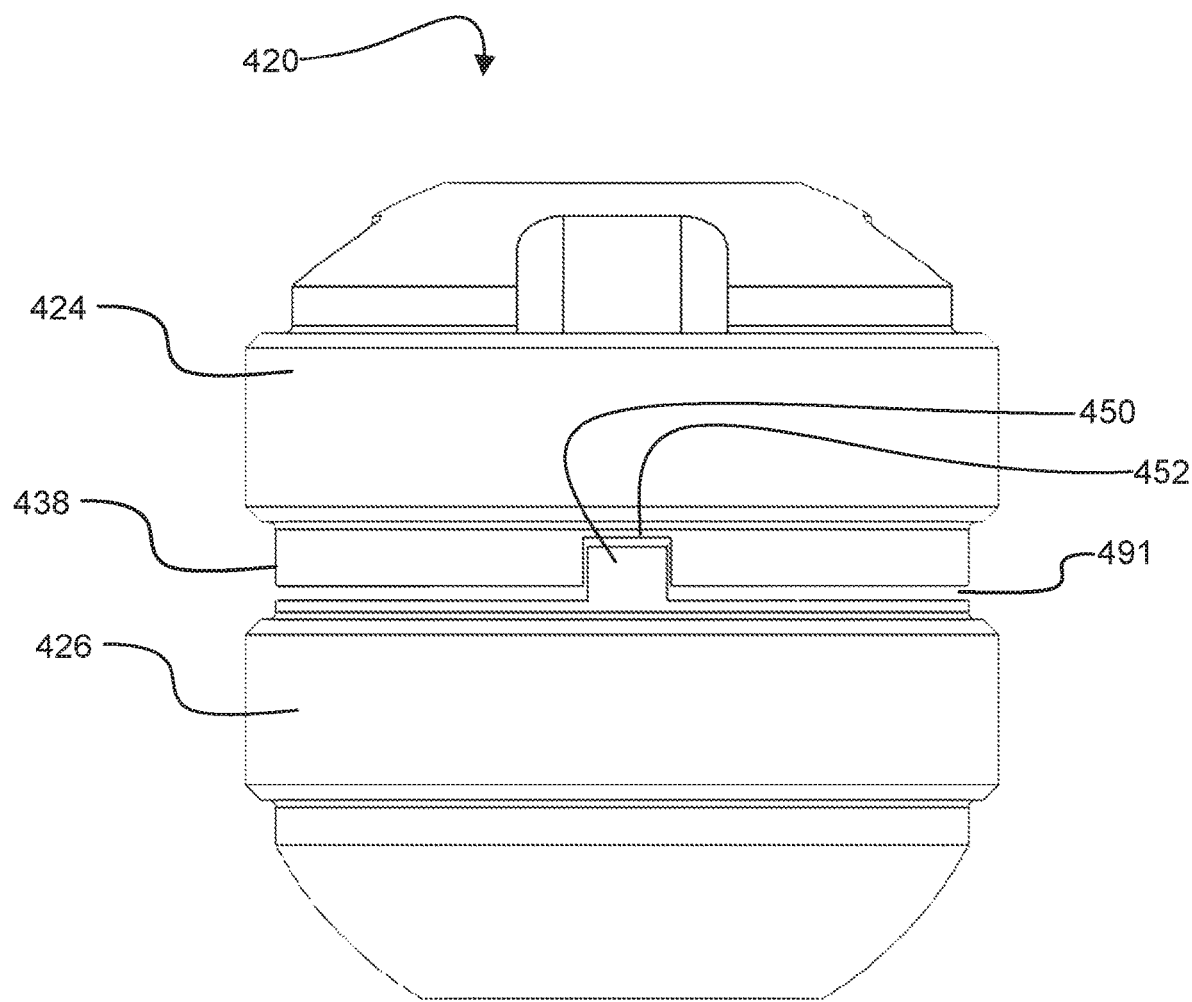
FIG. 15 illustrates a side view of a sleeve in accordance with an example of the present disclosure.

FIG. 15 illustrates another example of a sleeve 420 that can be operable with the locking push-pull fastener assembly 14 of FIG. 6. In this example, the sleeve 420 can comprise a first portion 424, a second portion 426, and an axial displacement portion 438. The axial displacement portion 438 of FIG. 13 comprises a space 491 between the first portion 424 and the second portion 426, and a tongue 450 of the second portion 426 slidably located within a groove 452 of the first portion 424. Contact between the sides of the tongue 450 and the groove 452 transmit torque from the first portion 424 to the second portion 426 when an operator rotates the sleeve 420. When an operator applies a compressive force to the sleeve 420, for instance by torqueing a clamping fastener, the first portion 424 and the second portion 426 move towards one another as the sides of the tongue 450 slide within the groove 452 to facilitate axial movement between the first portion 424 and the second portion 426. Thus, the first portion 424 and the second portion 426 remain substantially undeformed while the axial displacement portion 438 experiences a reduction in height.

The preceding examples can be used by an operator to implement a method for securing a platform, such as platform 10 of FIG. 1, to a base, such as base 12 of FIG. 1. The method can include turning a locking push-pull fastener assembly, such as the locking push-pull fastener assembly 14 of FIG. 2, within a threaded aperture of the platform to position the platform relative to the base. The locking push-pull fastener assembly can be any of the previously described locking push-pull fastener assemblies. An axial compressive force can be applied to the sleeve to compress a region of the sleeve to move a first thread of a first portion axially towards a second thread of a second portion to bind an outer thread of the sleeve to an inner thread of the platform to axially lock the sleeve relative to the platform.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein.

Accordingly, it is not intended that the invention be limited, except as by the claims set forth below.

What is claimed is:

1. A locking push-pull fastener assembly for facilitating the locking of a precision adjustment fastener mechanism, the locking push-pull fastener comprising:
    a fastener;
    a sleeve having an aperture extending along a axis of the sleeve, wherein the fastener is positioned within the aperture, the sleeve comprising:
        a first portion and a second portion, the first portion moveable relative to the second portion along the axis, the first portion comprising an outer surface having one or more threads operable to interface with one or more inner threads of a platform, and the second portion comprising an outer surface having one or more threads operable to interface with one more inner threads of the platform; and
        an axial displacement portion separating the first and second portions, the axial displacement portion transmitting a torque along the axis between the first and second portions, and facilitating movement of the first and second portions relative to one another to bind the one or more threads of the outer surfaces of the first and second portions with the one or more inner threads of the platform to axially lock the sleeve to the platform upon the sleeve being subject to an axially compressive force by the fastener.

2. The locking push-pull fastener of claim 1, wherein the axial displacement portion comprises a plurality of cuts in the sleeve extending from the aperture to an outer surface of the axial displacement portion.

3. The locking push-pull fastener of claim 2, wherein the axial displacement portion further comprises a relief formed in an outer surface of the axial displacement portion.

4. The locking push-pull fastener of claim 3, wherein at least one cut of the plurality of cuts is offset along the axis from at least one other cut of the plurality of cuts.

5. The locking push-pull fastener of claim 2, wherein at least one cut of the plurality of cuts is in a plane normal to the axis.

6. The locking push-pull fastener of claim 2, wherein at least one of the cuts extends in an axial direction.

7. The locking push-pull fastener of claim 1, further comprising at least one recess at an end of the sleeve for receiving an adjustment tool.

8. The locking push-pull fastener of claim 1, wherein the axial displacement portion comprises a first plurality of recesses in the first portion and a second plurality of recesses in the second portion and a plurality of pins sized and shaped to be received in the first plurality of recesses and the second plurality of recesses.

9. A precision adjustment fastener mechanism comprising:
    a base having a first aperture for receiving a clamping fastener;
    a platform comprising a second aperture having one or more inner threads;
    a locking push-pull fastener assembly disposed within the second aperture, the locking push-pull fastener assembly comprising:
        a clamping fastener having a portion positioned in the first aperture;
        a sleeve having a third aperture extending along a axis of the sleeve, wherein the clamping fastener is positioned within the third aperture, the sleeve comprising:
            a first portion and a second portion, the first portion moveable relative to the second portion along the axis, the first portion comprising one or more outer threads operable to interface with the one more inner threads of the platform, and the second portion comprising one or more outer threads operable to interface with the one more inner threads of the platform; and
            an axial displacement portion separating the first and second portions, the axial displacement portion transmitting a torque along the axis between the first and second portions, and facilitating movement of the first and second portions relative to one another to bind the one or more threads of the outer surfaces of the first and second portions with the one or more inner threads of the platform to axially lock the sleeve to the platform upon the sleeve being subject to an axially compressive force by the clamping fastener.

10. The precision adjustment fastener mechanism of claim 9, wherein the axial displacement portion further comprises a relief formed in an outer surface of the axial displacement portion.

11. The precision adjustment fastener mechanism of claim 9, wherein the axial displacement portion comprises a plurality of cuts in the sleeve extending from the aperture to an outer surface of the axial displacement portion.

12. The precision adjustment fastener mechanism of claim 11, wherein at least one cut of the plurality of cuts is offset along the axis from at least one other radial cut of the plurality of cuts.

13. The precision adjustment fastener mechanism of claim 11, wherein at least one of the cuts extends in an axial direction.

14. The precision adjustment fastener mechanism of claim 11, wherein the clamping fastener comprises a head having a diameter greater than a diameter of the third aperture and a threaded end and the first aperture comprises an inner thread complementary to the threaded end.

15. The precision adjustment fastener mechanism of claim 14, further comprises a lower spherical washer disposed between the base and the locking push-pull fastener and an upper spherical washer disposed between the head and the locking push-pull fastener.

16. The precision adjustment fastener mechanism of claim 15, further comprising a flat washer and a spring washer, wherein the flat washer is located between the head and the spring washer and the spring washer is located between the flat washer and the upper spherical washer.

17. The precision adjustment fastener mechanism of claim 14, wherein the clamping fastener further comprises a port extending from the head to the one or more inner threads of the platform.

18. A method for securing a platform, comprising:
turning a locking push-pull fastener assembly within a threaded aperture of a platform to position the platform relative to a base, wherein the locking push-pull fastener comprises a sleeve having a first threaded portion and a second threaded portion separated by an axial displacement portion having a lower axial stiffness than the first threaded portion and the second threaded portion; and
applying an axial force to the locking push-pull fastener to compress a region of the locking push-pull fastener to move a first thread portion axially towards a second thread portion to bind an outer thread of the threaded locking push-pull fastener to an inner thread of the platform to axially lock the sleeve relative to the platform.

19. The method of claim 18, wherein a threaded fastener extends through the locking push-pull fastener into a threaded aperture of the base and wherein applying an axial force comprises tightening the threaded fastener.

\* \* \* \* \*